(12) United States Patent
Brouckaert et al.

(10) Patent No.: US 12,480,315 B2
(45) Date of Patent: Nov. 25, 2025

(54) COATED PANEL

(71) Applicant: FLOORING INDUSTRIES LIMITED, SARL, Bertrange (LU)

(72) Inventors: Dries Brouckaert, Gullegem (BE); Christophe Naeyaert, Jabbeke (BE); Bryan Rollier, Kanegem (BE)

(73) Assignee: UNILIN, BV, Wielsbeke (BE)

( * ) Notice: Subject to any disclaimer, the term of this patent is extended or adjusted under 35 U.S.C. 154(b) by 190 days.

(21) Appl. No.: 18/016,268

(22) PCT Filed: Jun. 21, 2021

(86) PCT No.: PCT/IB2021/055438
§ 371 (c)(1),
(2) Date: Jan. 13, 2023

(87) PCT Pub. No.: WO2022/013647
PCT Pub. Date: Jan. 20, 2022

(65) Prior Publication Data
US 2023/0287690 A1    Sep. 14, 2023

(30) Foreign Application Priority Data

Jul. 17, 2020 (BE) .................. 2020/5539
Nov. 23, 2020 (BE) .................. 2020/5843

(51) Int. Cl.
*E04F 15/00* (2006.01)
*B32B 3/06* (2006.01)
(Continued)

(52) U.S. Cl.
CPC .......... *E04F 15/02038* (2013.01); *B32B 3/06* (2013.01); *B32B 7/022* (2019.01);
(Continued)

(58) Field of Classification Search
CPC . B44F 9/02; B32B 27/08; B32B 27/40; B32B 3/06; B32B 27/304; B32B 27/36;
(Continued)

(56) References Cited

U.S. PATENT DOCUMENTS 9,745,756 B2   8/2017 Hannig
10,677,275 B1*  6/2020 Caselli ............... E04B 1/82
(Continued)

FOREIGN PATENT DOCUMENTS

DE   102012112562 A1   6/2014
DE   102013113478 A1   6/2015
(Continued)

OTHER PUBLICATIONS

Belgian Search Report from corresponding Belgian Application No. BE202005539, Mar. 31, 2021.
(Continued)

*Primary Examiner* — Chi Q Nguyen
(74) *Attorney, Agent, or Firm* — Workman Nydegger (57) ABSTRACT

A coated panel with a substrate and a decorative top layer. The substrate includes an, optionally filled, plastic composite. The coated panel is provided on at least a first pair of two opposite edges with mechanical coupling means that allow two such panels to be coupled to each other on the first pair of edges in question. Locking is obtained both in a vertical direction perpendicular to the plane of the coupled panels, and in a horizontal direction perpendicular to the respective edges and in the plane of the coupled panels. The mechanical coupling means or coupling parts allow a displacement in the direction along the coupled edges.

16 Claims, 4 Drawing Sheets

(51) Int. Cl.
  *B32B 7/022* (2019.01)
  *B32B 27/08* (2006.01)
  *B32B 27/20* (2006.01)
  *B32B 27/22* (2006.01)
  *B32B 27/30* (2006.01)
  *B44F 9/02* (2006.01)
  *E04F 15/02* (2006.01)
  *E04F 15/10* (2006.01)

(52) U.S. Cl.
  CPC .............. *B32B 27/08* (2013.01); *B32B 27/20* (2013.01); *B32B 27/22* (2013.01); *B32B 27/304* (2013.01); *B44F 9/02* (2013.01); *E04F 15/105* (2013.01); *E04F 15/107* (2013.01); *B32B 2250/24* (2013.01); *B32B 2255/10* (2013.01); *B32B 2255/26* (2013.01); *B32B 2307/4023* (2013.01); *B32B 2307/536* (2013.01); *B32B 2307/554* (2013.01); *B32B 2307/7376* (2023.05); *B32B 2419/04* (2013.01); *E04F 2201/0146* (2013.01); *E04F 2201/0153* (2013.01); *E04F 2201/023* (2013.01); *E04F 2201/043* (2013.01)

(58) Field of Classification Search
  CPC ......... B32B 7/022; B32B 27/20; B32B 27/22; B32B 27/32; B32B 2307/536; B32B 2419/04; B32B 2307/7376; B32B 2255/26; B32B 2307/554; B32B 2255/10; B32B 2307/4023; B32B 2250/24; B27M 3/04; E04F 15/02033; E04F 15/02038; E04F 15/02016; E04F 15/107; E04F 15/105; E04F 2201/043; E04F 2201/0153; E04F 2201/0146; E04F 2201/023
  See application file for complete search history.

(56) References Cited

U.S. PATENT DOCUMENTS

| | | | |
|---|---|---|---|
| 11,002,020 | B2 | 5/2021 | Hannig |
| 2010/0118149 | A1* | 5/2010 | Levin ................... G06Q 10/06 348/169 |
| 2011/0138722 | A1 | 6/2011 | Hannig |
| 2013/0104485 | A1* | 5/2013 | Meersseman ............ B27N 7/00 428/53 |
| 2014/0033633 | A1* | 2/2014 | Kell ........................ E04F 13/26 403/348 |
| 2014/0109507 | A1 | 4/2014 | Dossche et al. |
| 2015/0218812 | A1* | 8/2015 | Kell ........................ E04F 15/04 428/99 |
| 2017/0335571 | A1 | 11/2017 | Hannig |
| 2018/0258651 | A1* | 9/2018 | Meersseman ............ B32B 37/10 |
| 2019/0292793 | A1* | 9/2019 | Van Vlassenrode .... B29C 70/08 |
| 2021/0309003 | A1 | 10/2021 | Zheng |
| 2021/0348397 | A1* | 11/2021 | Caselli ..................... B32B 3/06 |

FOREIGN PATENT DOCUMENTS

| | | | |
|---|---|---|---|
| EP | 1026341 | A2 | 8/2000 |
| EP | 2050582 | A1 | 4/2009 |
| EP | 2883712 | A1 | 6/2015 |
| EP | 3144449 | A1 | 3/2017 |
| EP | 3245352 | A1 | 11/2017 |
| EP | 4082766 | A1 | 11/2022 |
| WO | 97/47834 | A1 | 12/1997 |
| WO | 2006066776 | A2 | 6/2006 |
| WO | 2008078181 | A1 | 7/2008 |
| WO | 2009124704 | A1 | 10/2009 |
| WO | 2010023042 | A1 | 3/2010 |
| WO | 2011077311 | A2 | 6/2011 |
| WO | 2012004701 | A2 | 1/2012 |
| WO | 2013179261 | A1 | 12/2013 |
| WO | 2017001976 | A1 | 1/2017 |
| WO | 2017087725 | A1 | 5/2017 |
| WO | 2018087637 | A1 | 5/2018 |
| WO | 2018087638 | A1 | 5/2018 |
| WO | 2018158338 | A1 | 9/2018 |
| WO | 2018198034 | A1 | 11/2018 |
| WO | 2020124342 | A1 | 6/2020 |

OTHER PUBLICATIONS

Belgian Search Report from corresponding Belgian Application No. BE202005843, May 12, 2021.
International Search Report from corresponding PCT Application No. PCT/IB2021/055329, Oct. 15, 2021.

* cited by examiner

COATED PANEL

BACKGROUND

The present invention relates to a coated panel.

In particular, the invention relates to coated panels with a substrate and a decorative top layer, wherein the decorative top layer comprises a print and a transparent top layer applied thereon. Panels of this kind are widely known, for example from WO 97/47834, WO 2006/066776, WO 2010/023042 and WO 2011/077311, and may for example imitate parquet panels or stone or ceramic tiles. It is known from WO 97/47834 to provide such panels with coupling means, so that a floating floor covering can be assembled on the basis of panels of this kind.

The coated panels from WO° 97/47834 and WO 2006/066776 comprise a wood-based core, for example of HDF, coated with a hard decorative top layer of laminate. As a result, the floor panels in WO'834 are sensitive to moisture penetration and they lead to a sound of walking in use, which is perceived as annoying. In addition, the panels in WO'834 are liable to dimensional change when there is a change in air humidity in the environment.

The panels from WO 2010/023042 and WO 2011/077311 describe panels with a pliable core of for example flexible PVC and with a thermoplastic layer, for example also of PVC, as a wearing layer. Panels of this kind are built up from material that is resistant to water and offers a more acceptable sound of walking. Panels of this kind are, however, also liable to dimensional change, but only when there is a change in the temperature of the environment. In contrast to air humidity, the ambient temperature may be significantly less uniform over an area that is covered with panels. In the case of panels such as those from WO'042 and WO'311, this may lead to local expansion effects, for example where sunlight is directly incident on the covering. In the market, local expansion effects of this kind are indicated with "hot spot". The inventors have established that the floor coverings that are assembled with the panels from the prior art may rise locally as a result and may form a sort of bubbles, and/or the seams between the respective panels may project upward. This last-mentioned phenomenon is sometimes indicated in the market as "peaking".

SUMMARY

The present invention relates in the first place to an alternative coated panel, wherein according to various preferred embodiments, a solution is offered for the problems with the coated panels from the prior art.

For this purpose, the present invention relates according to a first independent aspect to a coated panel with a substrate and a decorative top layer, wherein the substrate comprises an, optionally filled, preferably thermoplastic, plastic layer, wherein the coated panel is provided on at least one first pair of two opposite edges with mechanical coupling means that allow two such panels to be coupled together on the first pair of edges in question, wherein locking is obtained both in a vertical direction perpendicular to the plane of the coupled panels, and in a horizontal direction perpendicular to the respective edges and in the plane of the coupled panels, with as characteristic feature that the aforementioned mechanical coupling means or coupling parts allow a displacement in the direction along the coupled edges, and wherein on the second pair of opposite edges a horizontally acting locking and/or contact surface is formed, preferably directly under the position where the upper surfaces of the coupled panels adjoin each other, and in that this contact surface is formed mainly, and preferably exclusively, on a compressible portion of the substrate and/or the top layer.

Because on a first pair of edges displacement is possible, a possible local expansion, in the direction of the first pair of edges, can always be compensated by a displacement. On the first and/or second pair of edges, the compressibility at the location of the horizontally acting locking or contact surface ensures that no troublesome deformation or upward pressing of the seams arises through the expansion perpendicular to the direction of these edges.

Preferably, in a floor covering assembled from coated panels of the invention, rows of panels are formed wherein at least the first pair of edges extend in each case in the direction of the respective row. In this way the risk of the formation of bubbles and "peaking" can be minimized most effectively. They may for example be rectangular and elongated panels wherein they are installed in rows that extend in the longitudinal direction of the panels. The pair of long edges of the roach form thereby Preferably both measures, namely both the displaceability and the compressible horizontally acting locking surface, are at least present on the first pair of edges, which preferably form a pair of long edges of an elongated panel.

According to a practical embodiment, the aforementioned horizontally acting locking or contact surface is formed on a first layer of the substrate and optionally on the superjacent decorative top layer, wherein the aforementioned first layer is more flexible than an underlying second layer of the substrate. Preferably both the first layer and the second layer are, optionally filled, plastic layers, preferably thermoplastic layers. Preferably both the first layer and the second layer comprise PVC, wherein the aforementioned first layer of the substrate comprises a higher proportion of plasticizer than the second layer located thereunder. Preferably the first layer comprises at least 5 phr of plasticizer more than the aforementioned second layer.

The aforementioned mechanical coupling means or coupling parts of the first pair of opposite edges may be produced with a clearance, fitting or with a clamping. Of course, any clamping may only affect the required possibility of displacement in an insignificant manner.

Preferably the energy per unit length necessary for the mutual displacement of the first pair of edges in the coupled state over a certain distance, is less than the energy per unit length necessary for the displacement of the second pair of edges in an installed state of two such panels, over the same distance. The energy may be obtained by recording the force exerted as a function of the movement obtained over the respective distance to be displaced. The area under the curve obtained is the required energy. Preferably the required energy on the first pair of edges per unit coupled length of these edges is less than 90%, or even less than 75%, of the required energy on the second pair of edges per unit of combined length of these edges. In order to keep the installed, coupled or combined length constant during a determination of the respective energy, it is possible to make one edge significantly longer than the other edge, so that during the complete recording of displacement the relevant length is equal to the length of the aforementioned other edge. It is clear that a smaller required energy leads to a better displaceability of the first pair of edges in comparison with the displaceability of the second pair of edges.

Preferably the force required to overcome the static gripping force, per unit length, is smaller for the first pair of edges in the coupled state, than for the second pair of edges in the installed or combined state of two such panels. The force required to overcome the static gripping force is the maximum force that is reached before the edges begin to move mutually. It is clear that a smaller static gripping force leads to a better displaceability of the first pair of edges in comparison with the displaceability of the second pair of edges.

Preferably the static gripping force on the first pair of edges is less than 25N per meter of the coupled edges, and preferably less than 10N per meter of the coupled edges. In combination with the above preferred embodiment, the static gripping force on the second pair of edges is preferably greater than 25N, or respectively greater than 10N per meter of the coupled edges.

Preferably the aforementioned mechanical coupling means of the first pair of edges are configured as a tongue and a groove that are delimited by an upper lip and a lower lip, wherein the aforementioned tongue and groove are provided with locking parts that counteract the moving apart of the aforementioned tongue and groove in the aforementioned horizontal direction, wherein the aforementioned lower lip is preferably unloaded, in a coupled state, or, preferably, displays a maximum deflection of 0.07 millimeter or less, or of 0.04 millimeter or less. The unloaded state or the state with limited loading of the lower lip avoids a large clamping force in the coupling of the first edges and prevents a too limited displaceability.

Preferably the coupling means of the first pair of edges in a coupled state always have one or more contact surfaces. As can be seen in a cross section through the coupled edges, the one or more contact surfaces preferably cover less than 25% of the contour of the respective edges, or even less than 15% or less than 10%. Owing to the limited contact surface, a displacement with less resistance is possible.

Preferably also the second pair of edges is provided with a male coupling part and a female coupling part with a projecting lip, wherein the aforementioned male and female coupling parts are provided with locking parts that counteract the moving apart of the coupling parts in a horizontal direction, or in other words with horizontally acting locking parts. Then the aforementioned projecting lip is preferably, in a coupled state, unloaded or, preferably, the aforementioned projecting lip displays a maximum deflection that is greater than the maximum deflection of the lower lip on the first pair of edges. Thus, for example, for the projecting lip it is possible to work with a deflection of more than 0.07 millimeter, or more than 0.04 millimeter, respectively. It is obvious that the male and female coupling part of the second pair of edges may be configured as a tongue and a groove delimited by an upper and a lower lip, wherein the aforementioned projecting lip is preferably formed by the aforementioned lower lip. It is also clear that the aforementioned compressible horizontally acting locking or contact surface then forms a stop surface for the horizontal movement of the coupled panels toward each other.

According to a divergent variant and/or another definition of the invention, the aforementioned mechanical coupling means or coupling parts of the first pair of edges, instead of displaying the feature that they allow a displacement in the direction along the coupled edges, may display the feature in connection with the required energy for displacement, gripping force, unloaded state or the state with limited loading of the lower lip and/or percentage contact surface in the coupled state, as presented above on the basis of the preferred embodiments. According to yet another possibility the panel may be provided, at least on the first pair of edges, with a lubricant such as graphite, oil or wax.

Preferably the panel is rectangular, wherein the panel is provided, both on the pair of long edges and on the pair of short edges, with coupling means, wherein the coupling means on the pair of long edges preferably allow two such panels to be coupled to each other by means of a rolling motion and the coupling means on the pair of short edges preferably allow two such panels to be coupled to each other by means of a downward motion, wherein the pair of long edges preferably form the aforementioned first pair of edges, and the pair of short edges preferably form the aforementioned second pair of edges.

Preferably at least one portion of the coupling means on the first pair of edges is provided with a water-repellent substance. Because the coupling parts on the first pair of edges are slidable or only clamp to a limited extent, it is possible for water to infiltrate into the seam formed between two such panels. A water-repellent substance can prevent infiltration.

Preferably the aforementioned decorative top layer comprises a print and a transparent wearing layer applied thereon.

The panel may have a lowered edge region on at least one edge. Both the aforementioned print and the aforementioned wearing layer may extend continuously thereby from on the central area of the panel over the aforementioned lowered edge region.

The presence of a lowered edge region on one or more edges, in particular on the aforementioned second pair of edges, may further limit the risk of peaking.

Preferably the aforementioned lowered edge region is a chamfer. Preferably the aforementioned chamfer makes an angle with the upper surface or the horizontal of less than 25°, or better still of 15° or less. A good value is 11°. Preferably said chamfer extends over a distance measured in the area of the panel of less than 2.5 millimeter. The actual associated depth is thus limited, in particular preferably less than 1.15 millimeter, better still less than 0.67 millimeter or less than 0.5 millimeter.

According to the most preferred embodiment, the chamfer extends over a depth that is less than the thickness of the wearing layer at the location of the central upper surface of the coated panel.

Preferably the aforementioned wearing layer has, at the location of the central area, a thickness of 0.3 mm or more, but preferably less than 0.75 mm.

Preferably the aforementioned wearing layer consists mainly of a thermoplastic, such as polyvinyl chloride, PVC. The use of a thermoplastic on the surface is desirable for minimizing tapping noises when using said panel as a floor panel, or for minimizing scratching noises when using said panel as a furniture panel or wall panel. Making a lowered edge region in a thermoplastic top layer, in particular in the case of PVC, gives rise in the prior art to the formation of a glossy zone along the edge where the lowered edge region is applied.

Preferably the aforementioned print is located on a thermoplastic carrier film, and it forms together with the film, for example a printed PVC film, PU film, PP film or PET film. In the case of a PP film it may for example be an oriented polypropylene film. In the case of a PVC film it is preferably a rigid PVC film, namely a film based on PVC without plasticizer or with a proportion of plasticizer of less than 5 phr (parts per hundred of the resin). Said rigid PVC film may be printed with a higher accuracy, certainly in the case of printing carried out with water-based inks. In such a case a drying operation based on heat supply in the printing process is desirable, but owing to the choice of rigid PVC the possible expansion of the film is limited. As mentioned above, the wearing layer preferably also comprises a thermoplastic material, such as flexible or rigid PVC, PU, PP or PET. In the case of a PVC wearing layer, it preferably comprises a proportion of plasticizer of more than 5 phr, or even more than 10 or 15 phr.

According to one alternative, applying the print on the underside of the wearing layer is not excluded. According to another alternative, the print is formed directly on the substrate, by means of printing that is carried out on the substrate, preferably with the provision of one or more priming coats.

Preferably the surface of the aforementioned lowered edge region is formed essentially by the material of the aforementioned wearing layer. In this way a similar wear resistance may be obtained over the whole surface of the coated panel.

Preferably the aforementioned print extends at the location of the aforementioned lowered edge region in one and the same plane as at the location of the central area. Thus, the substrate is preferably not deformed at the location of the lowered edge region.

Preferably the aforementioned substrate comprises a plastic layer with fillers, or it consists mainly of plastic and fillers. The plastic is preferably polyvinyl chloride (PVC), but may on the other hand also be selected from the list of polypropylene (PP), polyurethane (PU), polyethylene (PE) and polyethylene terephthalate (PET).

According to a particular embodiment, the coated panel of the invention has, on the second pair of edges, coupling means that can be fitted into each other by means of a downward motion.

According to a particular embodiment, the aforementioned substrate, as mentioned above, comprises several layers. Preferably a first layer with a first hardness is located between the aforementioned print and a second layer with a second hardness that is greater than the aforementioned first hardness. Said first layer may impart particular properties to the coated panel and/or in manufacture. Thus, for example, additional damping of tapping noises is obtained and deeper structural features may be provided in the surface of the panel. The difference in hardness is preferably at least 10 on the Shore A hardness scale. The aforementioned second layer then preferably has a hardness of 80 Shore A or more. The different hardness in the aforementioned layers may for example be achieved because both the first and the second layer contains polyvinyl chloride, wherein the content of plasticizer in the aforementioned first layer is higher than in the aforementioned second layer. Preferably there is a difference of at least 5 phr between the respective layers. Preferably, in the coupled state of two such panels, a locking and/or contact surface arises directly under the join of the respective upper surfaces of the coupled panels, wherein this contact surface is formed mainly, or even exclusively, on the material of the aforementioned first layer of both coupled panels and optionally on the superjacent layers of the decorative top layer. The inventors have noticed that with said geometry of the join of the upper surfaces there is a reduced tendency to peaking or bending-out of the upper edges in consequence of dimensional changes after installation, and/or in consequence of the application of a so-called pretension. The remaining tendency may further be masked by applying a lowered edge. Pretension, as stated above, is achieved by providing an overlap in the contours of the male and female coupling part, so that a light drive fit arises. Preferably the overlap is situated at least, and preferably essentially, at the location of the aforementioned horizontally acting locking surfaces. As a result, preferably a bending-out arises on the underside of the panel, for example on the side with the groove. The bent-out portion then presses, in an attempt to return to its state of rest, the male coupling part toward the female coupling part. Therefore preferably a tension arises on the aforementioned contact surface under the join of the upper surfaces of the coupled panels. This tension will, to a reduced extent, lead to peaking in consequence of the formation of the contact surface on the aforementioned first layer. As mentioned above, any loading of the lower lip of the groove on the first pair of edges is preferably limited to a load that gives rise to a bending-out of at most 0.07 millimeter.

It is clear that the effects such as are described above may also be achieved when a coating, for example with a water-repellent substance, is present on one or both contact surfaces. Preferably in such a case it is a coating of limited thickness, preferably less than 0.1 mm thick, or even less than 0.01 mm thick. It may for example be a coating with the water-repellent substance that is described in more detail hereunder. In the context of the present invention, with this kind of configuration the contact surface will always be regarded as formed on the substrate and optionally the superjacent horizontal layers of the decorative top layer.

Preferably the substrate contains one or more glass fiber layers. In this way, dimensional changes of the panel can be limited overall. Any deformations as a result of dimensional changes that may nevertheless occur can then be further minimized or prevented by means of the measures of the invention, namely the displaceability or limited clamping on the first pair of edges and the compressible contact surface on the second pair of edges.

Preferably at least one portion of the surface of the aforementioned coupling means is provided with a water-repellent substance. Because a water-repellent substance is used, the applied pretension may be limited, while nevertheless achieving a sufficient waterproof result for the seam between the coupled panels. This possibility leads to a reduced tendency to bending-out of the coupled upper edges. Preferably the aforementioned water-repellent substance is provided directly under the join of the upper surfaces of the coupled panels, or at the very least at a position above the actual coupling means, namely at a level above the aforementioned horizontal locking surfaces, and preferably also above the level of any vertically acting locking surfaces.

A fluoro copolymer is preferably used as the aforementioned water-repellent substance.

The aforementioned coupling means may have one or a combination of two or more of the following properties:
  the property that the mechanical coupling means or coupling parts are mainly configured as a tongue and a groove delimited by an upper lip and a lower lip, wherein said tongue and groove are mainly responsible for the locking in the aforementioned vertical direction, and wherein the tongue and the groove are provided with secondary locking parts, mainly responsible for the locking in the aforementioned horizontal direction. Preferably the locking parts comprise a projection on the underside of the tongue and a recess in the lower lip of the groove. Such coupling means and locking parts are for example known from WO 97/47834;
  the property that the mechanical coupling means or coupling parts press the coupled floor panels against each other, for example because these mechanical coupling means are configured with so-called pretension, such as is known per se from EP 1 026 341. The clamping force with which the floor panels are pressed against each other or toward each other may, for example, in combination with the above property, be obtained by means of a lower lip bent outwards in the coupled position, or some other portion of a female coupling part, which in an attempt to spring back, presses against the underside of the tongue or the male coupling part;

the property that the mechanical coupling means allow coupling based on a horizontal, or almost horizontal, sliding movement of the panels toward each other;

the property that the mechanical coupling means allow coupling based on a rolling motion along the respective edges;

the property that the mechanical coupling means allow coupling based on a downward-directed motion of a male coupling part, for example with a tongue, into a female coupling part, for example with a groove. As stated, with panels of this type there is a risk of peaking;

the property that the mechanical coupling means, or at least the associated upper edge is produced on the basis of a milling operation with rotating milling tools.

It is clear that the coated panel of the invention according to the most preferred embodiment is a floor panel for forming a floating floor covering. It is however not excluded that the invention may find application for wall panels, ceiling panels or furniture panels.

The thickness of the coated panels of the invention is preferably between 3 and 8 mm, better still between 4 and 6 mm.

Preferably the coated panels of the invention have a useful area, namely the area that remains visible in a covering assembled from such panels, with a width between 12 and 25 centimeters, preferably between 15 and 22 centimeters, and a length between 110 and 210 centimeters, preferably between 115 and 150 centimeters.

BRIEF DESCRIPTION OF THE DRAWINGS

For better illustration of the features of the invention, some preferred embodiments are described hereunder, as examples without any limiting character, referring to the appended drawings, in which.

DETAILED DESCRIPTION OF VARIOUS EMBODIMENTS

Figure 1:
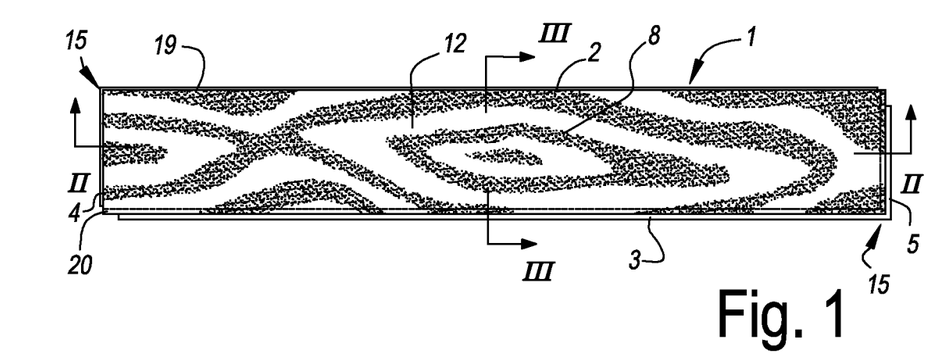
FIG. 1 shows a coated panel with the features of the invention.

FIG. 1 shows a rectangular and elongated coated panel 1, in this case a floor panel with a first pair of long opposite edges 2-3 and a second pair of short opposite edges 4-5.

Figure 2:
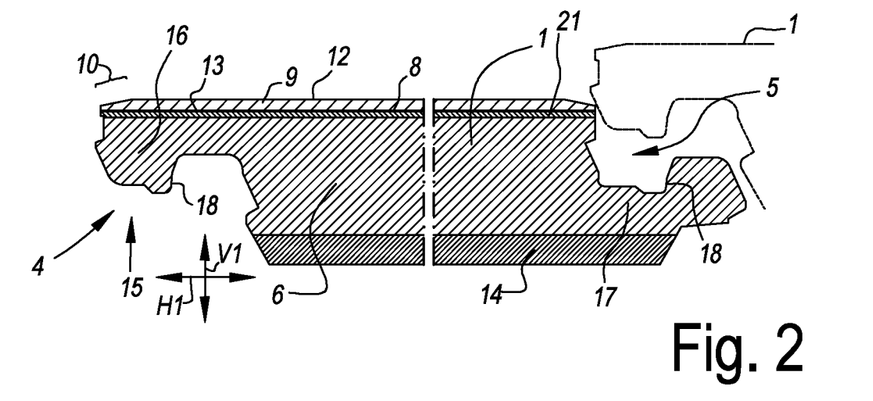
FIGS. 2 and 3 show, on a larger scale, a cross section along lines II-II and shown in FIG. 1.
Figure 3:
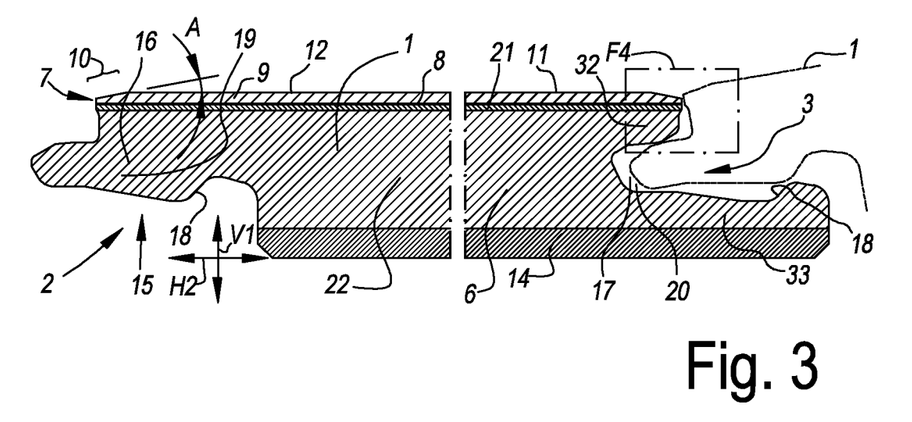

FIGS. 2 and 3 show that the panel 1 comprises a substrate 6 and a decorative top layer 7, wherein the decorative top layer 7 contains a print 8 and a transparent wearing layer 9 applied thereon.

The panel 1 has on at least one edge, and in this case on both edges of both the pair of short opposite edges 4-5 and the pair of long opposite edges 2-3, a lowered edge region 10. In this case the lowered edge region 10 is a chamfer that makes an angle A with the horizontal of less than 25°, in this case about 11°.

Figure 4:
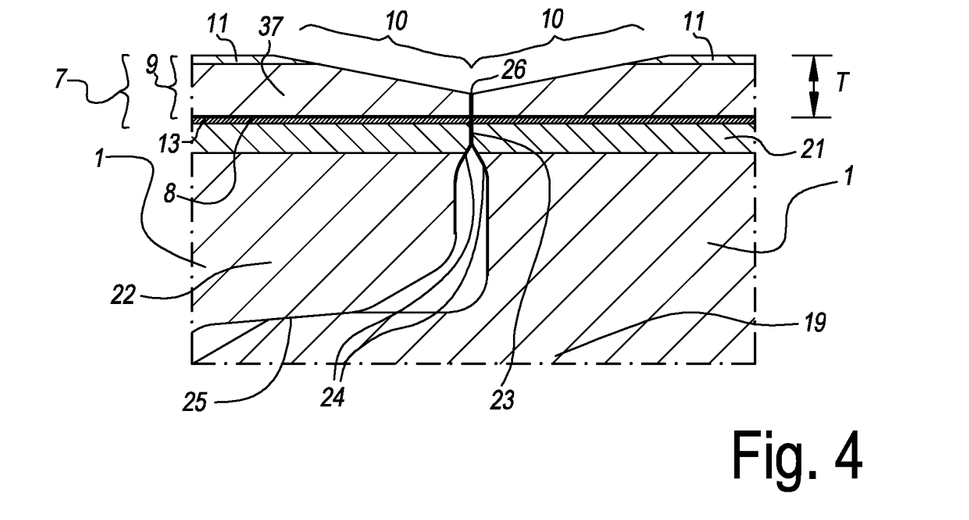
FIG. 4 shows, on a larger scale, a view of the region that is marked with F4 in FIG. 3.

FIG. 4 shows that the wearing layer 7 has a thickness T of at least 0.3 millimeter, in this case about 0.55 mm. The wearing layer 7 consists mainly of thermoplastic, in this case polyvinyl chloride, and has on the surface a surface layer 11, for example based on a radiation-cured polyurethane or acrylate compound.

Both the print 8 and the aforementioned wearing layer 9 extend continuously from on the central area 12 of the panel 1 over the lowered edge regions 10, and the surface of the aforementioned lowered edge region is essentially formed by the aforementioned wearing layer 9, except for the aforementioned surface layer 11. The print 8 extends at the location of the lowered edge region 10 in one and the same plane as at the location of the central area 12.

In the example, the print 8 is applied on a thermoplastic carrier film 13 and the substrate 6 consists mainly of plastic and/or fillers, such as PVC and calcium carbonate. On the underside of the substrate 6, a, preferably foamed, layer 14 is applied, for example based on crosslinked polyethylene, with a view to noise damping and/or accommodation of irregularities of the substrate.

FIGS. 2 and 3 clearly show that the floor panel 1 is provided on both pairs of opposite edges 2-3; 4-5 with coupling means 15 that allow two such panels 1 to be coupled to each other on the respective edges 2-3; 4-5. In the coupled state, locking occurs both in a vertical direction V1 perpendicular to the plane of the coupled floor panels 1, and in a horizontal direction H1-H2 perpendicular to the respective edges 2-3; 4-5 and in the plane of the coupled panels 1. The coupling means 15 are in each case configured as a male coupling part 16 and a female coupling part 17, wherein in the coupled state horizontally acting locking surfaces 18 are formed, which counteract the moving apart of the coupled floor panels 1 in the horizontal direction. On the pair of long opposite edges 2-3 the male coupling part 16 is formed by a sideways projecting tongue 19, and the female coupling part by a groove 20.

As is shown, the substrate 6 comprises several layers 21-22, wherein a first layer 21 with a first hardness is located between the aforementioned print 8 and a second layer 22 with a second hardness that is greater than the aforementioned first hardness. Both the first layer 21 and the second layer 22 contain polyvinyl chloride. The content of plasticizer in the aforementioned first layer 21 is higher than in the aforementioned second layer 22. In the coupled state of two such panels 1, a horizontally acting contact surface 23 arises directly under the join of the respective upper surfaces, wherein this contact surface 23 is formed exclusively on the aforementioned first layer 21 and the superjacent layers 8-9 of the decorative top layer 7, namely in particular at least on the first layer 21, and the wearing layer 9, except for the surface layer 11. The aforementioned horizontally acting locking surfaces 18, which counteract the moving apart of the tongue 19 and the groove 20, are formed exclusively on the material of the aforementioned second layer 22.

FIG. 4 further shows that at least one portion of the surface of the coupling means 15 is provided with a water-repellent substance 24. Preferably the water-repellent substance is at least provided directly under the join of the upper surfaces of the coupled panels 1, namely at a position above the actual coupling means 15, namely, in the case of the long opposite edges 2-3, above the engagement of the tongue 19 in the groove 20, namely above the level of any vertically acting locking surfaces 25. In this case the water-repellent substance 24 is at least provided on the aforementioned horizontally acting contact surface 23 that is located directly under the join of the upper surfaces.

Figure 5:
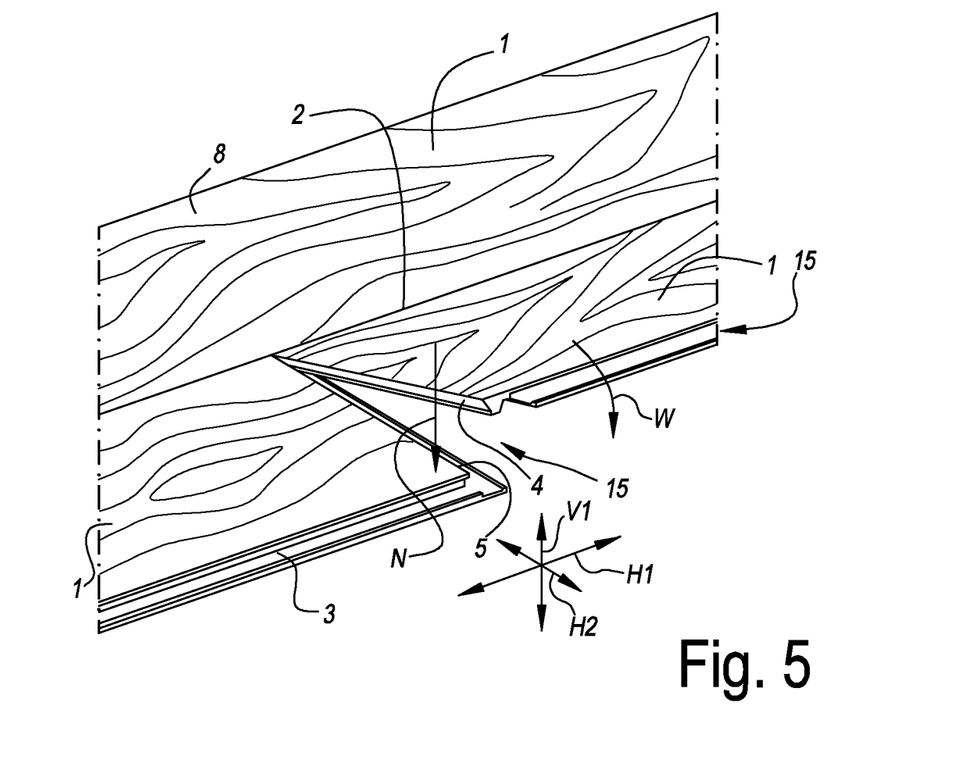
FIG. 5 shows in perspective how the panels from FIGS. 1 to 4 can be assembled into a floating floor covering.

FIG. 5 shows that the floor panel 1 from FIGS. 1 to 4 is suitable for assembling a floating floor covering. In this case the coupling means 15 on the pair of long edges 2-3 may be coupled to each other by means of a rolling motion W, and the coupling means 15 on the pair of short edges 4-5 may be coupled to each other by means of a downward motion N.

Figure 6:
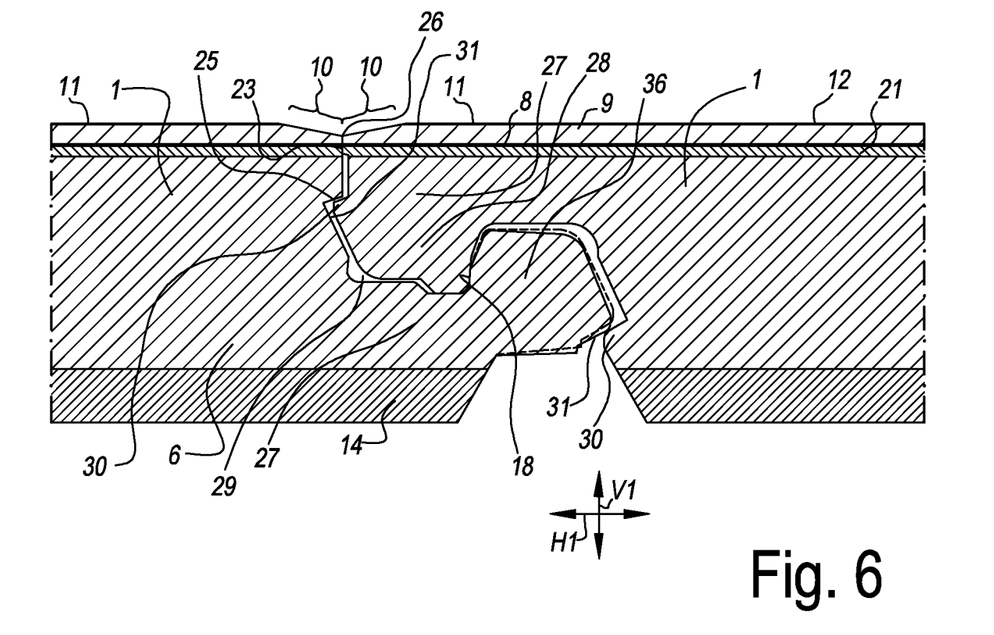
FIGS. 6 and 7 show the coupled state, in a view similar to that in FIGS. 2 and 3.
Figure 7:
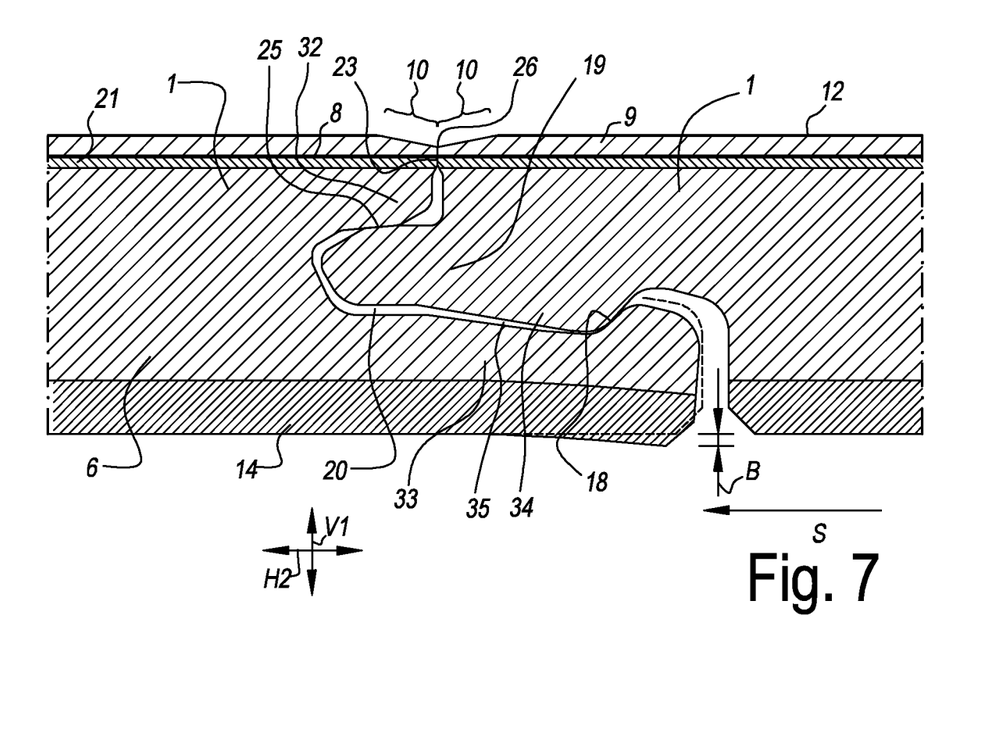

FIGS. 6 and 7 show the coupled state of the coupling means 15 on the pair of short opposite edges 4-5 and the pair of long opposite edges 2-3, respectively. The coupling means 15 and the associated upper edge 26 are produced on the basis of a milling operation with rotating milling tools.

The coupling means 15 on the pair of short opposite edges 4-5, shown in FIG. 6, are configured as a male coupling part 16 and a female coupling part 17, which can be fitted in one another. The male coupling part 16 comprises a hook-shaped portion 27 that projects on the upper side of the panel 1, and the female coupling part 17 comprises a hook-shaped portion 27 in the form of a lip that projects on the underside of the panel 1. The hook-shaped portion 27 of the male coupling part 16 comprises a downwards projecting locking part 28 that can interact with a recess 29 in the hook-shaped portion 27 of the female coupling part 17. The interaction of the downwards projecting locking part 28 and the recess 29 is substantially responsible for the locking in the horizontal direction H1. The hook-shaped portions 27 are further provided with one or more snap portions 30 and undercuts 31 interacting therewith, which provide the locking in the vertical direction V1.

The coupling means 15 on the pair of long opposite edges 2-3, shown in FIG. 7, are, as mentioned above, configured as a tongue 19 and a groove 20, delimited by an upper lip 32, or uppermost lip, and a lower lip 33, or bottommost lip. The tongue 19 and groove 20 provide the locking in the aforementioned vertical direction V1, and are provided with locking parts 34-35, mainly responsible for the locking in the aforementioned horizontal direction H2. In the example the locking parts comprise a projection 34 on the underside of the tongue 19 and a recess 35 in the lower lip 33 of the groove 20.

In this case the mechanical coupling means 15 are configured with pretension, obtained on the basis of a lower lip 33 bent outwards in the coupled position, which in an attempt to spring back, presses against the underside of the tongue 19.

The coupling means 15 shown here also allow coupling on the basis of a horizontal sliding movement S of the panels 1 toward each other.

Also in the example in FIG. 6, a pretension is applied because a portion 36 of the projecting lip of the female coupling part 17 is bent, in this case the upwards extending element 36 on the hook portion 27 of the female coupling part 17. This element 36 presses, in an attempt to spring back, against the male part 16, more particularly against the downwards projecting locking part 28 thereof.

FIG. 7 further shows that the lower lip 33 of the groove 20, in a coupled state, displays a maximum deflection B. In this case the maximum deflection B is less than 0.07 millimeter, namely about 0.04 millimeter.

Figure 8:
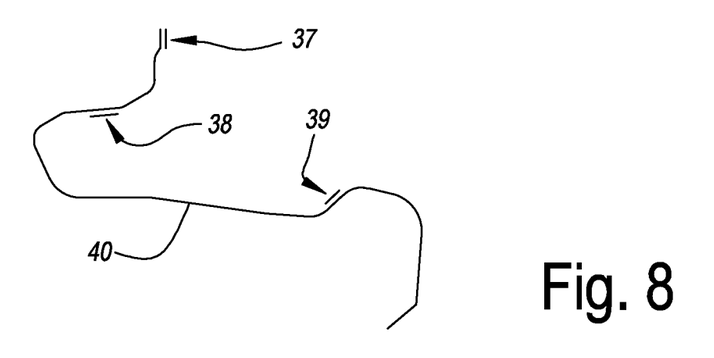
FIG. 8 shows the contour of the coupling means with the groove from FIG. 7.

FIGS. 7 and 8 further show that the coupling means 15 of the first pair of edges 2-3 in a coupled state always have one or more contact surfaces 37-38-39, in this case three contact surfaces 37-38-39, namely a contact 37 at the location of the aforementioned locking or contact surface 23, a contact 37 at the location of the vertically acting locking surfaces 25, namely between the upper side of the tongue 19 and the underside of the upper lip 33, and a contact 38 at the location of the locking surfaces 18. As can be seen in a cross section through the coupled edges, and in this example illustrated in FIG. 8, together the contact surfaces 37-38-39 only cover a limited portion of the contour 40 of the edge 3. In this case the contact surfaces 37-38-39 cover less than 10% of the length of this contour, as seen in the cross section perpendicular to the coupled edges, and illustrated in FIG. 8.

Figure 9:
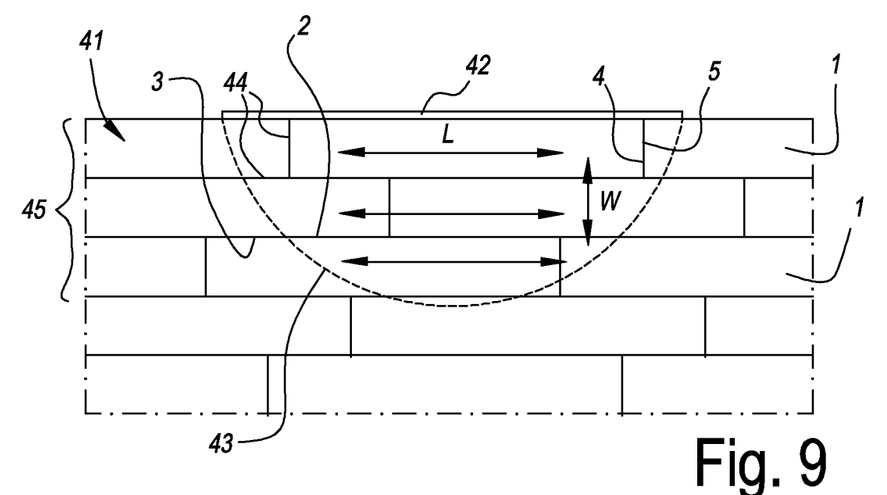
FIGS. 9 and 10 further illustrate possible advantages of the invention.
Figure 10:
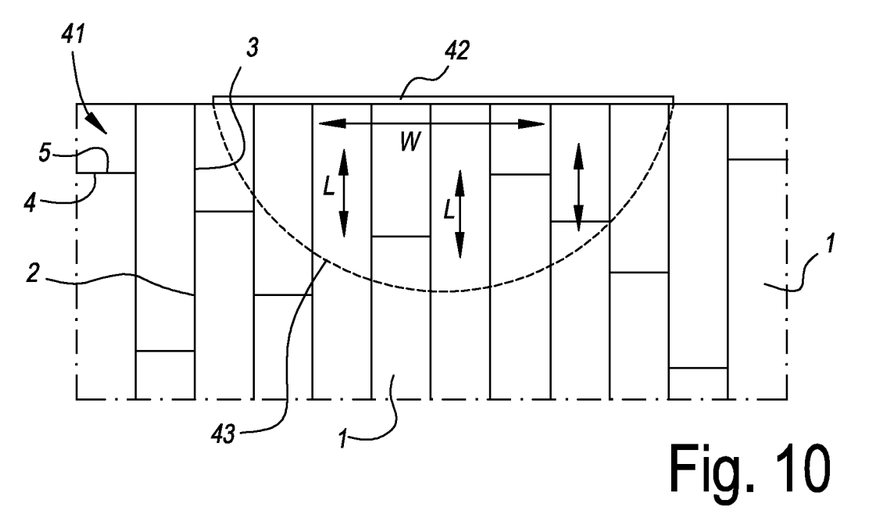

FIGS. 9 and 10 show a floor covering 41 assembled on the basis of panels 1 with the features of the invention, more particularly on the basis of the panels 1 shown in FIGS. 1 to 8. The floor coverings 41 only differ in that they are placed in different directions, namely in directions that are at right angles to each other.

The floor covering 41 is in each case provided in a room with a window section 42 through which sunlight can enter directly on the floor covering. This results in a hot spot on the floor covering 41, as indicated with the dashed line 43. Within the dashed line 43, the panels will expand. In the floor coverings from the prior art, this would give rise to formation of a bubble in this place and possibly to peaking on the seams 44.

With the coated panels 1 of the invention, in the case of FIG. 9, the expansion in the direction L will be able to push the other panels in the respective rows 45 where the hot spot is manifested and to allow them to be displaced, so that no bubble is formed. The expansion in the direction W of the panels that are located in the hot spot may be compensated by compression at the location of the contact surface 23 without peaking occurring. A displacement in the direction W is limited because the panels that are not located in the hot spot prevent or counteract a displacement. Now, these panels do not expand to the same extent, so that the width of the rows 45 barely changes, if at all.

The same action takes place in the case of the floor covering 41 in FIG. 10. The dimensional expansion in the direction L is compensated by displacement, whereas the dimensional expansion in the direction W leads to a compression at the location of the locking or contact surface 23.

The present invention is by no means limited to the embodiments described above, but coated panels of this kind, methods for the manufacture thereof, and milling tools employed therein may be realized while remaining within the scope of the present invention.

The invention claimed is:

1. A floor covering comprising a plurality of coated panels, each of said coated panels comprising a substrate and a decorative top layer superjacent to the substrate,
   wherein the substrate comprises a plastic layer,
   wherein the coated panel is provided on at least a first pair of two opposite edges with mechanical coupling parts that allow two of the coated panels to be coupled to each other on the first pair of edges,
   wherein locking of two of said coated panels is obtained both in a vertical direction perpendicular to a plane of the coupled coated panels, and in a horizontal direction perpendicular to the first pair of edges and in the plane of the coupled coated panels,
   wherein the mechanical coupling parts allow a displacement in a direction along the coupled edges, and
   wherein in a coupled condition of two or more of said coated panels on the first pair and/or on a second pair of opposite edges of the coated panels, a horizontally acting locking and/or a contact surface is formed, directly under a position where upper surfaces of the coupled coated panels abut against each other, and in that the contact surface is formed mainly on a compressible portion of the substrate and/or the decorative top layer;

wherein the mechanical coupling parts of the first pair of edges of the coated panels are configured as a tongue and a groove that is delimited by an upper lip and a lower lip;

wherein the tongue and groove are provided with locking parts that counteract a moving apart of the tongue and groove in the horizontal direction;

wherein the lower lip in a coupled state is unloaded or displays a maximum deflection of less than 0.07 millimeter.

2. The floor covering of claim 1, wherein the horizontally acting locking or contact surface is formed on a first layer of the substrate and the decorative top layer, wherein the first layer is more flexible than an underlying second layer of the substrate, wherein both the first layer and the second layer comprise PVC and the first layer of the substrate comprises a higher proportion of plasticizer than the second layer located thereunder.

3. The floor covering of claim 1, wherein the mechanical coupling parts of the first pair of opposite edges are configured with a clearance, fitting or with a clamping.

4. The floor covering of claim 1, wherein the panel is rectangular, wherein the panel is provided both on the pair of long edges and on the pair of short edges with coupling parts, wherein the coupling parts on the pair of long edges allow two of the coated panels to be coupled to each other by a rolling motion, and the coupling parts on the pair of short edges allow two of the coated panels to be coupled to each other by a downward motion, wherein the pair of long edges form the first pair of edges, and the pair of short edges form the second pair of edges.

5. The floor covering of claim 1, wherein at least one portion of the coupling parts is provided on the first pair of edges with a water-repellent substance.

6. The floor covering of claim 1, wherein the decorative top layer comprises a print and a thermoplastic wearing layer applied thereon.

7. The floor covering of claim 6, wherein the panel has a lowered edge region at least on one edge, wherein both the print and the wearing layer extend continuously from on a central area of the panel over the lowered edge region.

8. The floor covering of claim 7, wherein the lowered edge region relates to a chamfer.

9. The floor covering of claim 7, wherein the surface of the lowered edge region is formed essentially by the wearing layer.

10. The floor covering of claim 9, wherein in the coupled state of two of the coated panels, contact surface arises directly under a join of the respective upper surfaces of the coupled coated panels, wherein this contact surface mainly, or even exclusively, is formed on a material of a first layer and the superjacent layers of the decorative top layer.

11. The floor covering of claim 7, wherein the print extends at a location of the lowered edge region in one and the same plane as at a location of the central area.

12. The floor covering of claim 6, wherein the wearing layer has, at the location of a central area, a thickness of 0.3 mm or more, but less than 0.75 mm.

13. The floor covering of claim 6, wherein the wearing layer consists mainly of a thermoplastic, such as polyvinyl chloride.

14. The floor covering of claim 6, wherein the print is applied on a thermoplastic carrier film.

15. The floor covering of claim 6, wherein the substrate comprises several layers, wherein a first layer with a first hardness is located between the print and a second layer with a second hardness that is greater than the first hardness.

16. The floor covering of claim 15, wherein both the first layer and the second layer contain polyvinyl chloride, wherein a content of plasticizer in the first layer is higher than in the second layer.

* * * * *